_____

United States Patent Office 3,087,976
Patented Apr. 30, 1963

_____

1

3,087,976
PROCESS FOR MAKING HALOGENATED
ORGANIC COMPOUNDS
Murray Hauptschein, Glenside, and Arnold H. Fainberg, Elkins Park, Pa., assignors to Pennsalt Chemicals Corporation, Philadelphia, Pa., a corporation of Pennsylvania
No Drawing. Filed Apr. 26, 1960, Ser. No. 24,672
9 Claims. (Cl. 260—653)

This invention relates to a catalytic process for the conversion of monohydrochlorofluoromethanes to methanes of higher fluorine content by disproportionation reactions.

The monohydro halogenated methanes $CHClF_2$ and $CHF_3$ are useful as refrigerants, aerosol propellents and as intermediates for the preparation of other valuable compounds. For example, $CHClF_2$ may be pyrolyzed to produce tetrafluoroethylene in good yields and conversions. Fluoroform may be brominated to produce $CF_3Br$ useful as a refrigerant and fire extinguishing agent. Commercially such compounds are often prepared by the fluorination of chloroform with anhydrous hydrogen fluoride in the presence of fluorine containing metal salts, such as antimony chlorofluorides.

A disadvantage of this process is that both the hydrogen fluoride and the catalyst employed are highly corrosive and require special handling and equipment precautions. As the fluorination proceeds from the lower to the more highly fluorinated monohydromethanes, it is necessary to employ more and more drastic conditions to introduce additional fluorine, still further increasing the corrosion problems. Another drawback is the necessity of separating hydrogen fluoride from the products following the fluorination reaction.

It has been previously proposed to disproportionate $CHCl_2F$ and $CHClF_2$ to obtain methanes of higher fluorine content by passing them over aluminum chloride or aluminum fluoride catalysts in the vapor phase. An aluminum chloride catalyst, however, has the disadvantage that it sublimes during the operation, shortening the catalyst life and causing handling difficulties. Aluminum fluoride catalysts have the disadvantage that they must be specially prepared by relatively tedious methods such as the fluorination of aluminum chloride with anhydrous hydrogen fluoride in order to obtain a catalyst having a practicable level of activity.

In accordance with the present invention, a simple, efficient, vapor phase catalytic process has been discovered, which substantially eliminates the handling of corrosive materials, by which the monohydrochlorofluoromethanes $CHCl_2F$ and $CHClF_2$ may be converted through disproportionation reactions into a more highly fluorinated state. Generally speaking, the process of the invention involves contacting in the vapor phase $CHCl_2F$ or $CHClF_2$ with a specially treated activated alumina catalyst at a temperature of from about 25° C. to 600° C. to produce monohydromethanes of higher fluorine content than the starting materials. In this process, very high conversions and yields of the disproportionated products are obtained in a convenient, simple, vapor phase reaction.

The catalyst is prepared by treating activated alumina with a lower fluorocarbon (i.e. a relatively low molecular weight fluorine containing carbon compound) containing not more than one hydrogen atom at an elevated temperature and continuing the treatment until the evolution of carbon oxides has substantially ceased. During the course of such treatment, an exothermic reaction occurs accompanied by the evolution of carbon monoxide and/or carbon dioxide together in some cases with variable amounts of other products. When the evolution of carbon oxides has substantially ceased, the catalyst is ready for use.

Activated alumina which is required in the preparation of the catalyst of the invention, is characterized, as is well recognized in the art, by its relatively high surface area as distinguished from non-activated forms such as corundum or alpha alumina which are dense, low-surface materials. Typically, activated aluminas may have surface areas ranging, e.g. from 10 to 300 square meters per gram.

As is well known, activated aluminas are generally prepared by the controlled dehydration or calcination of hydrated aluminas which may be natural or synthetic. Thus, for example, the controlled calcination of alpha alumina trihydrate or beta alumina trihydrate will produce a highly porous structure having high internal surface area. The hydrated alumina starting material may be natural, such as bauxite, or synthetically prepared such as by the precipitation of aluminum nitrate, aluminum sulfate or other soluble aluminum salt to produce a hydrated alumina gel which is then washed and calcined under controlled temperature conditions to produce the activated form.

It is highly preferred to employ essentially unmodified activated alumina, that is an activated alumina which contains at the most small amounts, e.g. one to two percent, of other materials (other than inert residues such as carbon from binders and the like). Desirably, the alumina should be low in $Na_2O$ and $Fe_2O_3$. Although essentially unmodified activated alumina is preferred, in some case it may prove desirable to employ an activated alumina containing minor amounts, e.g. from one to twenty percent, of other metals or metal oxides, such as chromium oxide, cobalt oxide, molybdenum oxide and the like. The presence of such metals or metal oxides will often modify the selectivity and/or activity of the catalyst in a given reaction.

The lower fluorocarbons used in the treatment of the activated alumina are relatively low molecular weight fluorine containing carbon compounds usually not containing more than about 8 carbon atoms and preferably of the order of from 1 to 4 carbon atoms. The treatment of the activated alumina with the fluorocarbon to produce the catalyst should be conducted in the vapor phase and it is generally impractical therefore to employ higher molecular weight fluorocarbons which are difficult or impracticable to handle in the vapor phase.

As pointed out above, the fluorocarbon employed for the preparation of the catalyst should not contain more than one hydrogen atom. Apparently, the presence of multiple hydrogen atoms in the molecule interferes with the activation reaction. Thus, for example when the fluorine containing compound $CH_3CF_2Cl$ is passed over activated alumina at a temperature of about 300° C., reaction apparently does occur as evidenced by the evolution of $H_2O$ and $CH_2=CClF$. Carbon oxides, however, are not evolved and the alumina so treated has relatively low activity as a catalyst.

Preferred fluorocarbons for th treatment of the activated alumina to produce the catalyst are those which in addition to carbon and fluorine contain only elements selected from the class consisting of chlorine and hydrogen, particularly fluoroalkanes of this type. Thus, included in this group are perfluorocarbons (i.e. containing only fluorine and carbon), perfluorochlorocarbons (i.e. containing only carbon, fluorine and chlorine);

perfluorohydrocarbons (i.e. containing only carbon, fluorine and hydrogen); and perfluorochlorohydrocarbons (i.e. containing only carbon, fluorine, chlorine and hydrogen); provided always that not more than one hydrogen atom is present in the molecule.

Particularly preferred are the lower perfluorochloroalkanes (i.e. alkanes containing only the elements carbon, fluorine and chlorine). Desirably, the perfluorochloroalkanes employed should have one to six and preferably from one to three carbon atoms. Such compounds have been found to impart high activity to the catalyst, are readily available, and relatively cheap, particularly the perfluororchloroalkanes containing one and two carbon atoms.

Specific examples of fluorocarbons suitable for the treatment of the activated alumina are $CF_2ClCFCl_2$;

$CF_3CCl_3$; $CF_2ClCF_2Cl$; $CF_3CFCl_2$; $CFCl_2CFCl_2$ $CF_2ClCCl_3$; $CF_2Cl_2$; $CF_3Cl$; $CFCl_3$; $CF_2HCl$ $CF_3CFClCF_2Cl$; $C_3Cl_3F_5$ $$\begin{array}{cc} CFCl\text{---}CFCl; & CF_2\text{---}CF_2 \\ | \quad\quad | & | \quad\quad | \\ CF_2\text{---}CF_2 & CCl_2\text{---}CCl_2 \end{array}$$

$CF_3H$ and $CF_3CF=CF_2$

In the preparation of the catalyst, before treatment with the fluorocarbon, it is desirable first to dry the alumina to remove adsorbed moisture. This may be accomplished by heating the activated alumina to a temperature of e.g. 300° to 600° C., preferably 350° to 550° C. for a sufficient time to insure the elimination of any free water, e.g. from 5 minutes to 5 hours. Desirably, during the drying operation, the activated alumina is swept with a stream of an inert gas such as nitrogen.

The treatment of the activated alumina with the fluorocarbon is carried out in the vapor phase at elevated temperatures usually ranging from about 150° C. to 800° C. and preferably from 200° C. to 500° C. In most cases, particularly with the fluorochlorocarbons having from 1 to 3 carbon atoms, the optimum activation temperature, giving catalysts of optimum activity, will range from about 250° C. to 450° C.

An exothermic reaction occurs between the fluorocarbon and the alumina as evidenced by a rise in temperature in the bed. The minimum temperature at which such a reaction may be initiated will vary depending upon the fluorocarbon employed. Reaction may be initiated at temperatures as low as 150° F. with materials such as $CF_2HCl$ whereas with materials such as $CF_2Cl_2$ or $CF_2ClCFCl_2$, minimum temperatures of about 200° C. are required to initiate the reaction. In other cases, still higher temperatures may be required to initiate reaction.

The maximum temperature during the activation treatment should not exceed about 800° C. to avoid damage to the catalyst. Indeed, in order to avoid reduction of activity, the catalyst should not be permitted to remain at temperatures above about 500° C. for substantial periods of time during the activation treatment. Thus, while temperatures of the order of 600 to 800° C. for a few minutes resulting e.g. from the exotherm of the reaction may be tolerated, longer periods at these high temperatures may damage the catalyst.

The principal gaseous reaction products during the activation treatment are carbon oxides. These may be in the form of carbon monoxide, carbon dioxide or both and/or in the form of carbon oxide addition products, particularly $COCl_2$ and/or $COClF$. It is understood that the term carbon oxide is intended to include such addition products as well as carbon dioxide and carbon monoxide. Other products such as tetrachloroethylene, carbon tetrachloride, chloroform and chlorofluoroalkanes may also be produced.

Where the treatment of the activated alumina with the fluorocarbon is carried out in a fixed bed, the reaction appears to proceed from the input to the exit of the bed as evidenced by the appearance of a hot zone which travels down the bed in the direction of the gas flow. This hot zone results from the rather strong exothermicity of the activation reaction and care should be taken to avoid the excessive temperatures in the hot zone where apparently most of the reaction is taking place. As pointed out above maximum bed temperatures in excess of about 800° C. should be avoided, and for best results, the catalyst bed temperatures should not be permitted to remain above about 500° C. for substantial periods of time. The maximum temperature reached in the hot zone will depend upon the initial catalyst bed temperature, the temperature and rate of flow of the activating fluorocarbon, the bed dimensions and the like. In order to control maximum bed temperatures during the activation treatment it may be desirable to dilute the fluorocarbon vapors employed for the activation with an inert gas such as nitrogen in order to moderate the exothermicity of the reaction and/or to employ means such as cooling tubes inserted in the catalyst bed in order to remove the heat of reaction during the course of the activation treatment.

Completion of the activation treatment is signaled by a sudden drop, or substantial cessation of the generation of carbon oxides. The generation of carbon oxides may continue subsequently during the use of the catalyst, but the rate of generation is very low relative to the rate of generation during the activation treatment. In fixed bed operations, the completion of the activation may also be observed by the hot zone reaching the exit end of the bed. Depending on the activating agent, the initiation of the activation reaction may occur at a temperature lower than that required to fully activate the catalyst. In such cases it may be necessary or desirable to successively raise the activation temperature (but not above about 800° C.) until the evolution of carbon oxides has substantially ceased.

The time required to complete the activation will depend somewhat upon the temperature employed, the catalyst size, the length and other dimensions of the catalyst bed and the like. Typical activation times under normal conditions may range e.g. from 5 minutes to 5 hours.

During the activation procedure, fluorine derived from the activating fluorocarbon is apparently "fixed" in the activated alumina which shows a weight increase (dry basis) during the activation procedure generally ranging from 1% to 40%, and more usually from about 3% to 20%. During subsequent use, the catalyst may continue to show a very gradual additional increase in weight.

The pressure during the activation treatment is not critical except in the sense that the treatment should be carried out in the vapor phase and accordingly superatmospheric pressures sufficiently high to cause condensation of the reactants or reaction products on the catalyst at the operating temperature employed should be avoided. While atmospheric pressure operation will often be most convenient and economical, subatmospheric and moderate superatmospheric pressures ranging e.g. from one-tenth of an atmosphere to ten atmospheres may be sometimes desirable.

The high activity of these catalysts for the disproportionation of monohydrochlorofluoromethanes is not entirely understood. They have higher activity for such reactions than previously known catalysts containing aluminum and fluorine such as aluminum fluoride prepared e.g. by the fluorination of $AlCl_3$ or alumina with hydrogen fluoride. Apparently, the aluminum and the fluorine in the catalyst of the invention are associated in a different manner than in these prior catalysts.

Aside from their simplicity of preparation and mode of use, these catalysts also have the advantage of relatively long life. When after prolonged operation the activity of the catalyst begins to decline, it is apparently the result of the gradual deposit of carbon. When this occurs the activity of the catalyst can be readily restored by a relatively simple regeneration procedure involving the passage of oxygen or oxygen containing gases (e.g. air) over the catalyst at temperatures e.g. from 350–500° C. This results in the oxidation of the deposited carbon restoring the catalyst to essentially its original activity. Excessive temperatures should be avoided during the regeneration procedure so as to avoid damaging the catalyst.

The preparation of catalysts useful in the process of the invention is described in further detail in copending application Serial No. 18,505, filed March 30, 1960, of Murray Hauptschein and Milton Braid for "Catalyst Composition."

The disproportionation reactions catalyzed by the catalysts prepared as described above may be represented by the following equations.

(Equation 1)

$$2CHCl_2F \rightarrow CHClF_2 + CHCl_3$$

(Equation 2)

$$2CHClF_2 \rightarrow CHF_3 + CHCl_2F$$

The above reactions show disproportionation between like molecules. Mixed disproportionation reactions may also occur between two molecules of a different degree of fluorination, viz:

(Equation 3)

$$CHCl_2F + CHClF_2 \rightarrow CF_3H + CHCl_3$$

The conversion of monohydrodifluorochloromethane to fluoroform is of particular interest. From the standpoint of $CHClF_2$ as the reactant, and $CHF_3$ as the desired product, the following equation can be written:

(Equation 4)

$$3CHClF_2 \rightarrow 2CHF_3 + CHCl_3$$

It is to be understood that the various disproportionation reactions described above may often proceed simultaneously. For example, when $CHClF_2$ is passed over the catalyst in accordance with the invention it will disproportionate to $CHF_3$ and $CHCl_2F$. The $CHCl_2F$ may then further disproportionate to produce $CHClF_2$ and $CHCl_3$ in accordance with Equation 1 and $CHCl_2F$ and $CHClF_2$ may interact in accordance with Equation 4.

The process of the invention is carried out by passing the monohydrofluorochloromethane in the vapor phase through the catalyst bed at catalyst bed temperatures of from 25° C. to 600° C. and preferably from 100° C. to 400° C. The reactants may be preheated approximately to the desired catalyst bed temperature before passing over the catalyst. In some cases, the reaction involved may be somewhat exothermic and it may be desirable in such cases to preheat the reactants to a temperature somewhat below the desired equilibrium catalyst temperature.

Although the disproportionation reactions proceed at appreciable rates at temperatures as low as 25° C., the rates are considerably better at temperatures of 100° C. and higher. Also, at low temperatures there is a tendency for $CHCl_3$ (boiling point 61° C.) to condense in the catalyst reducing its activity. At temperatures above about 600° C. on the other hand, the catalyst life is shortened and in addition, moderate temperatures (100–400° C.) appear to favor higher conversions. It is believed that the reactions occurring are reversible and that at moderate temperatures the equilibria favor the higher fluorine content disproportionation products.

Reaction pressure is not critical except in the sense that the reactants and the reaction products should be maintained in the vapor phase while in contact with the catalyst bed, and accordingly, super-atmospheric pressure sufficiently high to cause condensation of the reactants or reaction products on the catalyst at the operating temperature employed should be avoided. While atmospheric pressure operation will often be most convenient and economical, sub-atmospheric and moderate super-atmospheric pressures ranging e.g. from one-tenth of an atmosphere to twenty atmospheres may be found desirable. At low temperatures e.g. 25° C. to 60° C. sub-atmospheric pressures are useful in helping to prevent condensation of $CHCl_3$ on the catalyst.

The rate of flow of the reactants over the catalyst is not critical and may vary within wide limits, depending upon the reaction temperature, desired conversion, and other operating conditions. In most cases, practical flow rates will lie within the range of from 50 to 10,000 volumes of reactant vapor (calculated at 0° C. and 760 mm. Hg) per volume of catalyst (bulk volume) per hour. At these flow rates, reaction time (catalyst contact time) will vary from a fraction of a second to about a minute.

The reaction products and unreacted starting materials leaving the catalyst bed may be condensed by cooling and/or compression to form a liquid one-phase mixture from which the desired reaction products may be separated by ordinary fractional distillation, and the unreacted starting materials then recycled to the catalyst bed. Chloroform and $CHCl_2F$ may if desired be treated by conventional means such as HF fluorination in the presence of fluorine containing metal salts to upgrade them to $CHClF_2$ which is then used as a starting material in the process of the invention. The fractional distillation of the product mixtures produced in accordance with the invention is facilitated by the fact that hydrogen fluoride is not used or produced in the process and thus does not appear as a difficult-to-remove contaminant in the reaction products.

The following examples illustrate the invention.

*Examples 1 to 21*

Activated alumina in the form of ⅛″ x ⅛″ pellets containing precipitated chromium oxide was employed, analyzing as follows on an $H_2O$ free basis:

| | Percent |
|---|---|
| $Cr_2O_3$ | 19.7 |
| $Na_2O$ | 0.6 |
| $SiO_2$ | 0.15 |
| $CuO$ | 0.005 |
| $Fe_2O_3$ | 0.08 |
| $Ni_2O$ | 0.005 |
| $Al_2O_3$ | Remainder |

A bed of this alumina was heated to a temperature of 500° C. while sweeping with nitrogen for 1 hour resulting in a weight loss of 0.9% $H_2O$. While maintaining the bed temperature at approximately 400° C., a stream of vapors of $CF_2ClCFCl_2$ was passed through the bed at a space velocity of 180 volumes of $CF_2ClCFCl_2$ (at standard conditions) per volume of alumina per hour. After about 1 hour, the generation of carbon oxides ceased and activation was complete.

A catalyst prepared as described above (230 grams), contained in a 15 inch section of an electrically heated tube having an inside diameter of 1 inch, was employed in the disproportionation of $CHClF_2$. The $CHClF_2$ was metered to the reactor input and the product gases were led to a cooled receiver where the total product was collected. The product analyses were carried out using vapor fractometer and infrared techniques. The temperatures reported are average catalyst bed temperatures measured by several thermocouples located in an external longitudinal slot in the tube.

The results of 21 runs, in which the catalyst temperature varied from 100° C. to 350° C. and in which the $CHClF_2$ space velocity varied from 7 to 2000 volumes per volume of catalyst per hour, are summarized in the table below:

| Example | Temp., °C. | Space velocity volumes of CHClF₂ per volume of catalyst per hour | Mol percent conversion of CHClF₂ to— | | | |
|---|---|---|---|---|---|---|
| | | | CHF₃ | CHCl₂F | CHCl₃ | Total |
| 1 | 100 | 7 | 65.4 | 1.0 | 32.2 | 98.6 |
| 2 | 100 | 14 | 63.7 | 1.6 | 31.1 | 96.4 |
| 3 | 100 | 29 | 61.3 | 2.0 | 29.7 | 93.0 |
| 4 | 100 | 57 | 55.6 | 2.8 | 26.4 | 84.8 |
| 5 | 100 | 85 | 50.8 | 3.4 | 23.7 | 77.9 |
| 6 | 150 | 7 | 64.8 | 1.5 | 31.6 | 97.9 |
| 7 | 150 | 14 | 64.7 | 1.6 | 31.6 | 97.9 |
| 8 | 150 | 29 | 64.3 | 1.9 | 31.2 | 97.4 |
| 9 | 150 | 57 | 62.9 | 2.6 | 30.1 | 95.6 |
| 10 | 150 | 85 | 60.0 | 3.9 | 28.0 | 91.9 |
| 11 | 200 | 7 | 63.8 | 2.3 | 30.8 | 96.9 |
| 12 | 200 | 29 | 63.4 | 3.2 | 30.1 | 96.7 |
| 13 | 200 | 57 | 63.1 | 2.7 | 30.2 | 96.0 |
| 14 | 200 | 85 | 61.4 | 3.3 | 29.1 | 93.8 |
| 15 | 200 | 145 | 59.1 | 4.0 | 27.5 | 90.6 |
| 16 | 200 | 275 | 53.7 | 5.2 | 24.3 | 83.2 |
| 17 | 200 | 410 | 50.0 | 6.0 | 22.0 | 78.0 |
| 18 | 250 | 85 | 62.4 | 3.6 | 29.4 | 95.4 |
| 19 | 250 | 410 | 59.2 | 5.5 | 26.3 | 90.0 |
| 20 | 350 | 85 | 60.1 | 5.3 | 27.4 | 92.8 |
| 21 | 350 | 2,000 | 53.2 | 8.5 | 22.3 | 84.0 |

The disproportionation of CHClF₂ in accordance with the invention may be advantageously combined with conventional fluorination processes such as fluorination with hydrogen fluoride in the presence of fluorine containing salts such as antimony chlorofluorides. When for example, it is desired to produce CHF₃, CHClF₂ feed for the catalytic disproportionation reactor is produced in the usual way by feeding chloroform and hydrogen fluoride to a fluorination reactor containing an antimony chlorofluoride catalyst to produce CHClF₂ in known manner. The CHClF₂ produced is then catalytically treated in accordance with the invention to produce a maximum conversion to CHF₃ together with lower fluorine content disproportionation products CHCl₂F and CHCl₃. The crude disproportionation product is then condensed and dried after which the crude, dry product is fractionally distilled to separate CHF₃ from unreacted CHF₂Cl, CHCl₂F and CHCl₃ and the latter two materials are then recycled as feed to the fluorination reactor for conversion to CHClF₂ which in turn supplies additional feed to the disproportionation step. Using this procedure, the fluorination reactor may be operated under relatively mild conditions to produce the CHClF₂ feed for the disproportionation step which then performs the more difficult task of upgrading the CHClF₂ to CHF₃.

*Example 22*

Using the same catalyst and equipment as described in Examples 1 to 21, CHClF₂ was passed through the catalyst bed at a space velocity of 14 volumes of CHClF₂ per volume of catalyst per hour at about 25° C. For the first half hour, no organic material emerged from the tube, the catalyst apparently adsorbing it initially. The first organic product to emerge was CHF₃; after 0.8 hour, 96% of the exit gases were CHF₃. Shortly thereafter, a small amount of unreacted starting material was detected. During the next hour, the ratio of CHF₃ to starting material fell continuously; at the end of this period, the exit gases consisted of 34% CHF₃, 63% CHClF₂ and 3% CHCl₂F.

This example demonstrates that the catalyst is initially active even at temperatures as low as 25° C. The initial activity, however, drops off rapidly apparently because of the condensation on the catalyst of chloroform, one of the disproportionation products.

*Example 23*

The catalyst used in this example was prepared from activated alumina in the form of ⅛" x ⅛" cylindrical pellets containing over 99% (H₂O free basis) of alumina and low in sodium, iron and silica (0.03% Na₂O; 0.08% Fe₂O₃; 0.22% SiO₂). Before drying the alumina has a 26% weight loss on ignition at 1000° C. and a surface area of 231 square meters per gram. Approximately 156 grams of this alumina was placed in a 15/16" inside diameter x 15" section of an electrically heated tube and dried by heating to 500° C. while sweeping with nitrogen for about 1 hour resulting in the loss of 9.7% by dry weight of water. It was then cooled to 150° C. and CHClF₂ vapors were passed through the bed at a space velocity of 260 volumes of CHClF₂ (at standard conditions) per hour per volume of alumina. A large amount of carbon monoxide was produced initially, no CO₂ being detected. Activation occurred rapidly; in about 4 minutes the catalyst was already quite active in promoting the disproportionation of CHClF₂ to CHF₃. In about 20 minutes the carbon monoxide production had fallen off to a negligible level. At this point, at a space velocity of 260, the conversion to products was as follows: 53% CHF₃; 3% CHCl₂F and 25% CHCl₃; a total conversion of 81%.

The catalyst temperature was then successively increased to 200° C.; 250° C.; and 300° C. At each level a new burst of carbon monoxide was produced for a limited time. At 300° C., after a total elapsed time of 1.5 hours, carbon monoxide production had dropped to a very small value.

After 4 hours of operation at 300° C. at a space velocity of 265, the conversion of CHClF₂ to products was as follows: 63.2% CHF₃; 2.5% CHCl₂F and 30.3% CHCl₃; a total conversion of 96%.

When the CHClF₂ space velocity was increased to 530 at 300° C., the conversion of CHClF₂ to products was as follows: 61% CHF₃; 3% CHCl₂F and 29% CHCl₃; a total conversion of 93%.

*Example 24*

Employing the same catalyst and equipment as described in Example 23, CHCl₂F vapors are passed over the catalyst at a catalyst bed temperature of 200° C. and a space velocity of 250 volumes of CHCl₂F per volume of catalyst per hour. Disproportionation products are obtained including major amounts of CHF₃ and CHCl₃ and minor amounts of CHClF₂.

It is to be understood that many other variations and embodiments are included within the scope of the invention in addition to those specifically described above; the embodiments described are for the purpose of illustrating and exemplifying the invention and the invention is not limited thereto.

We claim:

1. A method for converting monohydrofluorochloromethane starting material selected from the class consisting of CHCl₂F and CHClF₂ into a monohydromethane of higher fluorine content which comprises the step of contacting said starting material at a temperature between about 25° C. to 600° C. with a catalyst prepared by reacting activated alumina with a lower fluorocarbon having not more than 1 hydrogen atom, said reaction being carried out by contacting vapors of said fluorocarbon with activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of monohydrofluorochloromethanes into monohydromethanes of higher fluorine content.

2. A method in accordance with claim 1 in which the disproportionation of said monohydrofluorochloromethane is carried out at a temperature between 100° C. to 400° C.

3. A method for converting a monohydrofluorochloromethane starting material selected from the class consisting of $CHCl_2F$ and $CHClF_2$ into a monohydromethane of higher fluorine content which comprises the step of contacting said starting material at a temperature between 25° C. to 600° C. with a catalyst prepared by reacting activated alumina with a lower fluorocarbon containing only elements selected from the class consisting of carbon, fluorine, chlorine and hydrogen and having not more than 1 hydrogen atom, said reaction being carried out by contacting vapors of said fluorocarbon with said activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of monohydrofluorochloromethanes into monohydromethanes of higher fluorine content.

4. A method in accordance with claim 3 in which the disproportionation of said monohydrofluorochloromethane is carried out at temperatures between about 100° C. and 400° C.

5. A method for converting a monohydrofluorochloromethane starting material selected from the class consisting of $CHCl_2F$ and $CHClF_2$ into a monohydromethane of higher fluorine content which comprises the step of contacting said starting material at a temperature between about 25° C. and 600° C. with a catalyst prepared by reacting essentially unmodified activated alumina with a lower fluorocarbon containing only elements selected from the class consisting of carbon, fluorine, chlorine and hydrogen and having not more than 1 hydrogen atom, said reaction being carried out by contacting vapors of said fluorocarbon with said activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of monohydrofluorochloromethanes into monohydromethanes of higher fluorine content.

6. A method in accordance with claim 5 in which the disproportionation of said monohydrofluorochloromethane is carried out at temperatures between about 100° C. and 400° C.

7. A method for converting $CHClF_2$ to $CHF_3$ which comprises the step of contacting said $CHClF_2$ at a temperature between 25° C. and 600° C. with a catalyst prepared by reacting activated alumina with a lower fluorocarbon containing only elements selected from the class consisting of carbon, fluorine, chlorine and hydrogen and having not more than 1 hydrogen atom, said reaction being carried out by contacting vapors of said fluorocarbon with said activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of monohydrofluorochloromethanes into monohydromethanes of higher fluorine content.

8. A method in accordance with claim 7 in which the disproportionation of said $CHClF_2$ is carried out at temperatures between about 100° C. and 400° C.

9. A method for converting $CHClF_2$ to $CHF_3$ which comprises the step of contacting said $CHClF_2$ at a temperature between 100° C. and 400° C. with a catalyst prepared by reacting essentially unmodified activated alumina with a lower perfluorochloroalkane, said reacting being carried out by contacting vapors of said perfluorochloroalkane with activated alumina at a temperature of the order of 200° C. to 800° C. sufficiently high to initiate an exothermic reaction between said perfluorochloroalkane and said alumina in the course of which reaction said perfluorochloroalkane is converted to carbon oxide and said alumina increases in weight due to the association of fluorine derived from said perfluorochloroalkane therewith, said contacting and the reaction between said perfluorochloroalkane and said alumina being continued until the evolution of carbon oxide substantially ceases, whereupon the thus treated alumina is an active catalyst for the conversion of monohydrofluorochloromethanes into monohydromethanes of higher fluorine content.

References Cited in the file of this patent

UNITED STATES PATENTS

| | | |
|---|---|---|
| 1,994,035 | Croco | Mar. 12, 1935 |
| 2,637,748 | Miller | May 5, 1953 |
| 2,676,996 | Miller et al. | Apr. 27, 1954 |
| 2,694,739 | Pailthorp | Nov. 16, 1954 |
| 2,946,828 | Scherer et al. | July 26, 1960 |